United States Patent [19]

Nakazawa et al.

[11] Patent Number: 5,434,966
[45] Date of Patent: Jul. 18, 1995

[54] SYSTEM AND METHOD FOR STORING AND RETRIEVING THREE DIMENSIONAL SHAPES USING TWO DIMENSIONAL CONTRAST IMAGES

[75] Inventors: Shin-ichi Nakazawa; Hirohide Nabeshima, both of Chiba, Japan

[73] Assignee: KAO Corporation, Tokyo, Japan

[21] Appl. No.: 891,255

[22] Filed: Jun. 1, 1992

[30] Foreign Application Priority Data

May 31, 1991 [JP] Japan .................. 3-155312

[51] Int. Cl.6 ............................. G06F 3/00
[52] U.S. Cl. .................. 395/161; 395/600; 395/119
[58] Field of Search ............. 395/119–127, 395/155–161, 600; 382/9, 30, 36, 25, 28, 48

[56] References Cited

U.S. PATENT DOCUMENTS

| | | | |
|---|---|---|---|
| 4,685,070 | 8/1987 | Flinchbaugh | 395/124 |
| 4,813,013 | 3/1989 | Dunn | 395/159 |
| 4,845,643 | 7/1989 | Clapp | 395/127 |
| 4,858,150 | 8/1989 | Aizawa et al. | 395/120 |
| 4,868,766 | 9/1989 | Oosterholt | 395/120 |
| 5,010,502 | 4/1991 | Diebel et al. | 395/119 |
| 5,201,034 | 4/1993 | Matsuura et al. | 395/161 X |
| 5,237,647 | 8/1993 | Roberts et al. | 395/119 |

OTHER PUBLICATIONS

Penna, "Consumer Application for 3D Image Synthesis", IEEE 1988 ICCE, pp. 182–183.
Fujii et al, "Features and a Model for Icon Morphological Transformation", IEEE, 1991, pp. 240–245.
Microsoft Paintbrush, Microsoft Corp., 1986, pp. 12–20, 25–32, 44, 47–54, 58–61, 67–68, 87–89.
Myers, "Window Interfaces", IEEE, 1988, pp. 65–84.
Horikoshi et al, "3-D Shape Indexing Language", IEEE, 1990, pp. 493–499.

*Primary Examiner*—Mark R. Powell
*Assistant Examiner*—John E. Breene
*Attorney, Agent, or Firm*—Cushman, Darby & Cushman

[57] ABSTRACT

The present invention provides a system for retrieving graphic data. The system stores a plurality of sets of three dimensional graphic data each defining a three dimensional shape. The system further stores sets of two dimensional contrast data each defining a plan contrast view of a corresponding three dimensional shape and/or a cross sectional area defined by the three dimensional graphic data. The sets of two dimensional contrast data and three dimensional graphic data are correlated by alphanumerically coded retrieval keys. Groups of the two dimensional graphic data can be displayed on a screen of CRT display unit as key images. When an operator selects one or more of the key images, the corresponding three dimensional graphic information is retrieved via the retrieval keys and displayed on the screen of the CRT.

12 Claims, 4 Drawing Sheets

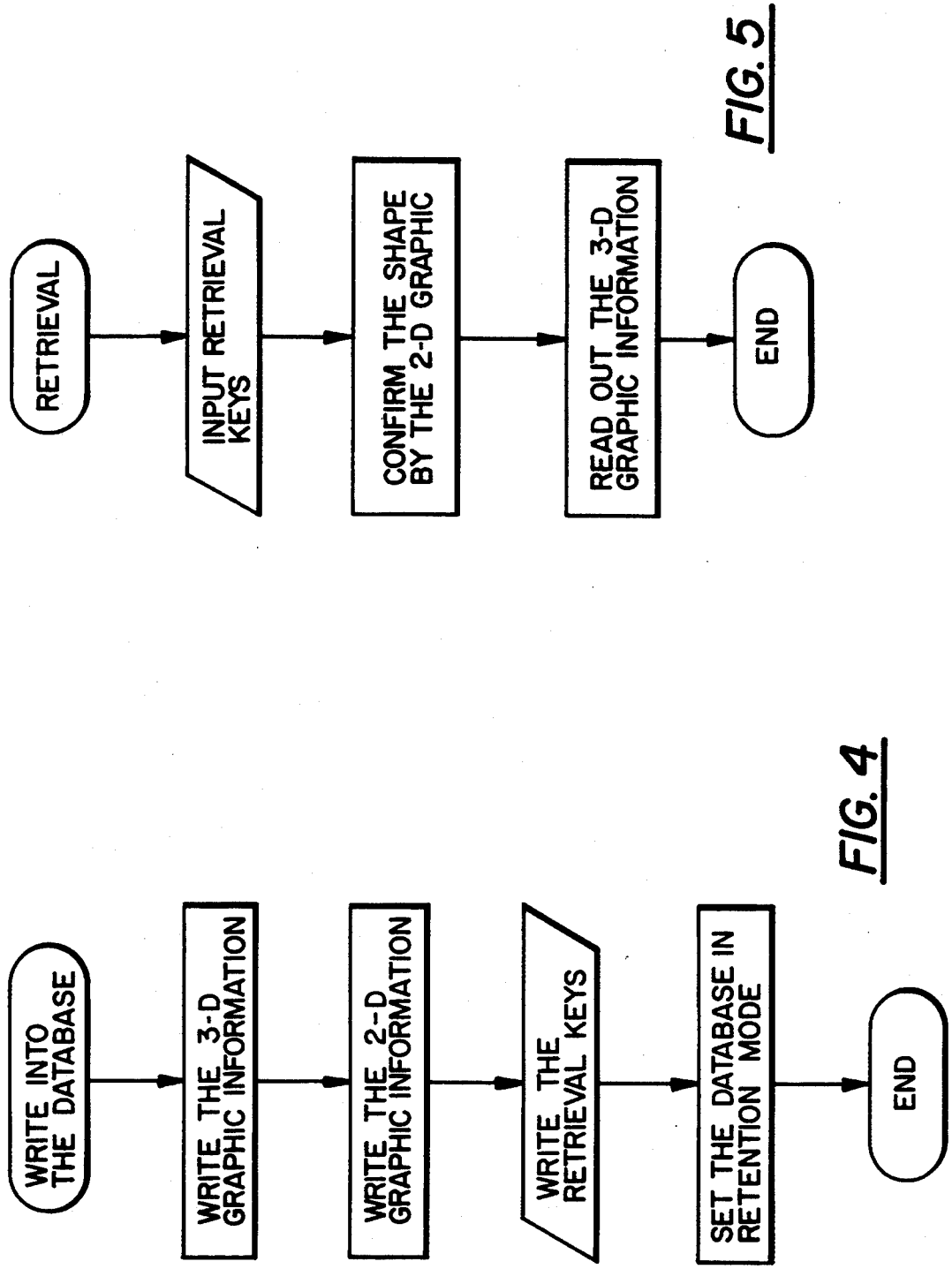

SYSTEM AND METHOD FOR STORING AND RETRIEVING THREE DIMENSIONAL SHAPES USING TWO DIMENSIONAL CONTRAST IMAGES

BACKGROUND OF THE INVENTION

1. Field of the Invention

This invention is applicable to a computer-aided design (CAD) system utilizing an information processing system. This invention relates to a system for retrieving three dimensional graphic information stored in a data base and originally was developed for designing bottle shapes but can be used to design other types of three dimensional objects.

2. Description of Related Art

As the technology of the CAD system has advanced in recent years, CAD systems have been developed which display, on a CRT display unit screen, a plan view of a three dimensional object defined by three dimensional graphic data input into the system. These systems are further capable of automatically adjusting the graphic data pertaining to the views of the object that are not displayed (e.g. back view, side views, etc.) based on alterations of the plan view displayed on the CRT display screen. In such a system, when a plan view of a shape is displayed on the screen of the CRT display unit and altered by an input device (e.g., a "mouse"), the related alterations automatically are made by the computer on the right and left side views, bottom view and top view. Some systems are designed to instruct users to input data in addition to the data relating to the plan view to achieve fully corrected and complete data relating to the entire three dimensional object.

Alternatively, a method for using a CAD system as described above has been proposed wherein many sets of graphic data are stored in a database. When a new shape is to be designed, stored graphic data relating to a desired shape image is read out from the data base and displayed on the CRT unit as the basic shape to be partially revised or modified by the operator. A method also has been proposed wherein a plurality of shape images, defined by graphic data stored in the database, are displayed on the screen of the CRT display unit simultaneously. The operator can set the positions and dimensions of each shape arbitrarily via an operation terminal and combine these shape images into one. These methods are excellent in reducing the number of steps in the design process.

In the CAD systems described above, it is preferable to store in the database information relating to a sufficiently large number of shapes and effectively select and retrieve out of the database the information relating to a shape which most resembles the desired shape. It is further preferable to reduce, as much as possible, the revisions or modifications of the existing shapes needed to form the new shapes in order to reduce the number of steps required for designing the new shapes. That is, if a basic "stored" shape better approximates the new shape which a designer desires, he/she can use the basic shape to design the new shape more easily.

Therefore, it is essential for the CAD system to be capable of retrieving, out of the large number of graphic data sets relating to a large number of shapes stored in the database, a basic "stored" shape most approximate to the desired shape. If the basic stored shape is simple, it can be identified by name such as a "circle" a "square" or a "rectangle" and thus retrieved by name. When the number of stored shapes is small enough to be coded by their characteristics, they can be retrieved by this characteristic code and an operator may display these stored shapes individually on the CRT display unit. The operator then may select one of these shapes for modification.

Several problems exist with a CAD system as described above which identifies the shapes by their named characteristic (e.g. "square"). For example, the number of existing bottle shapes is enormous (for instance, several thousands), and these shapes are not given names. If the graphic data sets relating to each of these large number of shapes is stored in the database, an operator using the above CAD system to design a new bottle shape from the existing shapes may waste much time retrieving each of these shape images from the database and displaying them individually on the display screen. Moreover, because the stored data relates to three dimensional shapes, it is not always possible to display the three dimensional image on the two dimensional screen accurately. Therefore, the designer/operator may view the image incorrectly and select an undesired image by mistake.

SUMMARY OF THE INVENTION

An object of the present invention is to provide an information retrieval system, for use with a CAD system, capable of accurately retrieving data relating to a desired shape from three dimensional data relating to a large number of three dimensional shapes and stored in a database.

To achieve this object, the present invention comprises a database for storing contrast data relating to two dimensional images. Each two dimensional image corresponds to a three dimensional image defined by three dimensional graphic data. The three dimensional graphic data and the corresponding two dimensional contrast data and/or data of perspective views are stored in the database and correlated by retrieval keys. The two dimensional images are displayed on a screen of the CRT display unit as key images. When an operator selects one of the key images represented by the corresponding two dimensional contrast data, the corresponding three dimensional graphic data is accessed via the retrieval keys.

In this embodiment, a group of the key images consist of nine front views and six cross-sections of corresponding three dimensional shapes defined by three dimensional graphic data stored in the database. Preferably, each of the nine views express the unique features of a corresponding three dimensional shape most effectively. It is also desireable to divide the display screen of the CRT unit into a plurality of segments, and simultaneously retrieve and display the key images of similar shapes in those segments.

A user learns the features of various three dimensional shapes from the corresponding key images. The groups of key images are displayed sequentially. That is, if the user does not select any of the key images from the group of key images displayed on the screen, the user can control the screen via the operating terminal to display another group of key images. This process can be repeated until the user views a desired key image. The user can select the desired two dimensional key image and thus access the corresponding three dimensional graphic data stored in the database via the retrieval keys.

The system is preferably designed to display the two dimensional key images at one corner of the display screen so that only the selected two dimensional key images are displayed as three dimensional shapes, defined by the three dimensional graphic data, on the major part of the display screen. The system also is designed to display additional key images on a portion of the screen when three dimensional data relating to selected shapes are on display on the major portion of the screen to allow more key images to be selected. Because this system can simultaneously display plural key images defined by two dimensional data, operators can compare them to each other and more easily select a desired image.

The arrangement of this system also permits users to select and combine plural shapes into a desired shape. For example, when designing a bottle, shapes of the bottle and of the lid can be separately selected, displayed at desired positions and sizes on the CRT screen, and combined on the screen of the CRT display device to form one desired shape.

BRIEF DESCRIPTION OF THE DRAWINGS

FIG. 4 is a flowchart depicting the steps for writing data in the database.

FIG. 5 is a flowchart depicting the steps for retrieving information from the database.

DETAILED DESCRIPTION OF THE PREFERRED EMBODIMENTS

Figure 1:
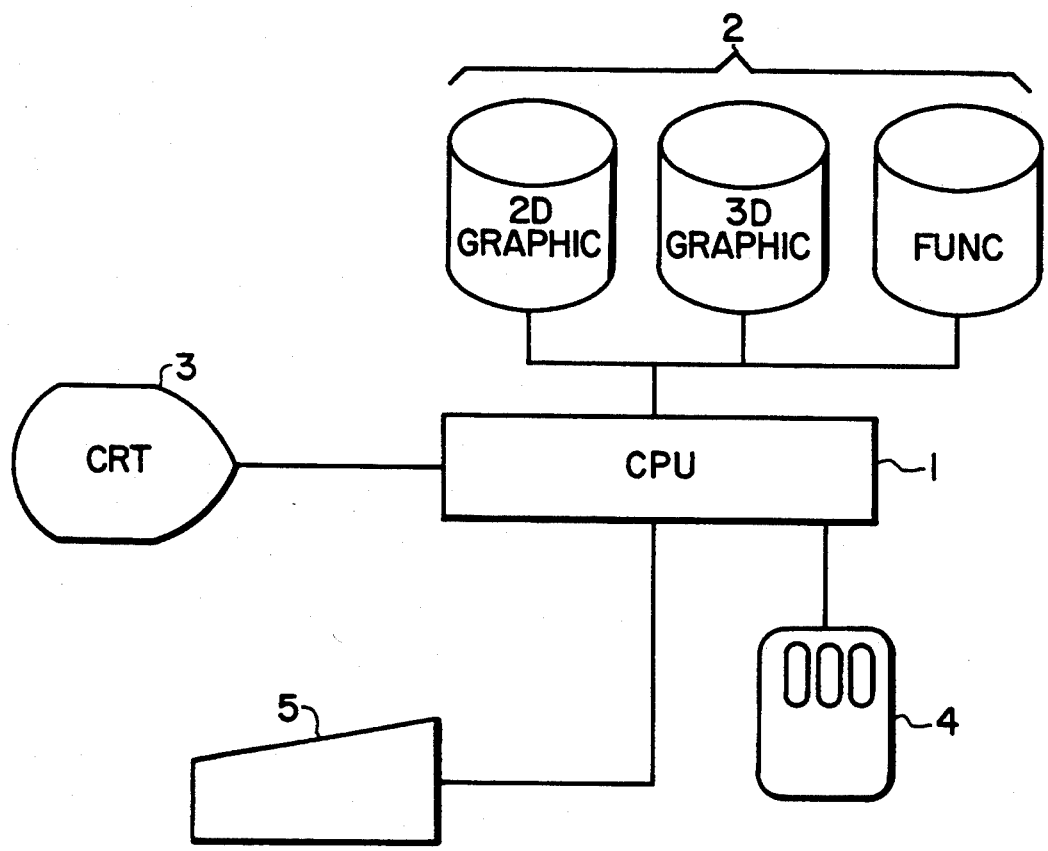
FIG. 1 is a block diagram showing an embodiment of the present invention.

FIG. 1 is a block diagram illustration of an embodiment of the present invention. This embodiment has been developed as a system for designing packaging bottles such as those for cosmetics, shampoo, household detergents and other consumer products or the like.

This system comprises a central processing unit 1, a database 2 coupled to the central processing unit 1, a CRT display unit 3 coupled to the central processing unit 1, and an operation terminal comprising a keyboard 5 and a mouse 4 which are both coupled to the central processing unit 1. The database 2 stores a plurality of sets of three dimensional graphic data each defining a three dimensional shape. The database 2 also stores a plurality of groups of two dimensional contrast data each relating to one of the groups of three dimensional graphic data.

Retrieval keys correlate each group of two dimensional contrast data with its related group of the three dimensional data. In this embodiment, the retrieval keys are a data code comprising alphanumeric characters. The related groups of three dimensional graphic data and two dimensional contrast data are identified by equivalent alphanumeric characters (i.e., retrieval keys). A portion of the characters of each retrieval key indicate whether the corrected group of data identified by that particular retrieval key is three dimensional graphic data or two dimensional contrast data. Also, a portion of the characters of retrieval keys represent other information pertaining to the shape. For example, in this embodiment, the other information pertaining to the bottle identifies the category of the bottle (usage of the bottle), the year of manufacture, whether the bottle is a known shape or a modification, the sales district, and the year of design.

The central processing unit 1 comprises a display access unit which accesses the graphic data stored in the database 2 and displaying the graphic data retrieved from the database 2 on the CRT display unit 3. The display access unit 7 displays the graphic data as two dimensional key images on the screen of the CRT display unit 3.

The key images are each defined by a corresponding set of the two dimensional contrast data. In this embodiment, each set of the two dimensional contrast data defines a view (e.g., frontal view) of a three dimensional shape defined by the corresponding set of three dimensional graphic data. Each set of three dimensional graphic data in this embodiment defines existing shapes of packaging containers. The sets of two dimensional contrast data or data of perspective views are derived from the sets of three dimensional graphic data and stored in the database 2 in a memory separate from the memory wherein the sets of three dimensional graphic data are stored. The database 2 is also provided with an additional memory for storing functional data such as programs or the like for controlling operation of the system.

In this embodiment, a group of key images consists of nine front views and six top views which are displayed simultaneously on the screen of the CRT display unit 3. The display access unit displays each group of key images sequentially on the screen of the CRT display unit 3. That is, if an operator does not wish to select one of the key images from among the group of key images (i.e. nine front views and six top views) being displayed on the screen, the operator can control the display access unit via the operation terminal to display another group of key images on the screen of the CRT display unit 3. This process can be repeated until the operator views a key image that he wishes to select.

The central processing unit 1 further comprises a selection unit for selecting, according to the instructions received from the operation terminal, the key images to be displayed as three dimensional images, defined by three dimensional graphic data, on the screen of the CRT display unit 3. The selection unit automatically retrieves the two dimensional contrast data corresponding to the key image that is selected by the user via the operation terminal. The selection unit also selects the corresponding set of three dimensional graphic data via the corresponding retrieval key. Hence, the three dimensional image defined by the three dimensional graphic data corresponding to the key image can be displayed in any arbitrary size on the screen.

Figure 2:
FIG. 2 illustrates the screen of the CRT display unit according to an embodiment of the present invention.

FIG. 2 shows an embodiment of the screen of the CRT display unit 3. As stated above, the display access unit controls the display of the images on the display screen, and frontal views and sectional views of the three dimensional shapes defined by the corresponding three dimensional graphic data stored in memory are displayed simultaneously as the two dimensional key images in the upper portion of the screen. By viewing the key images, an operator can quickly recognize and understand the outline of a corresponding three dimensional image as defined by the three dimensional graphical data.

In the screen shown in FIG. 2, the right column of the screen comprises a menu for operation, the upper left portion displays a menu from which the user can indicate whether the body of a bottle or a bottle cap is to be selected, and the lower portion of the screen is available to display messages necessary for operation.

The users can display the three dimensional image defined by the three dimensional graphic data read out from the database 2 in the major portion at the center of the screen.

Figure 3:
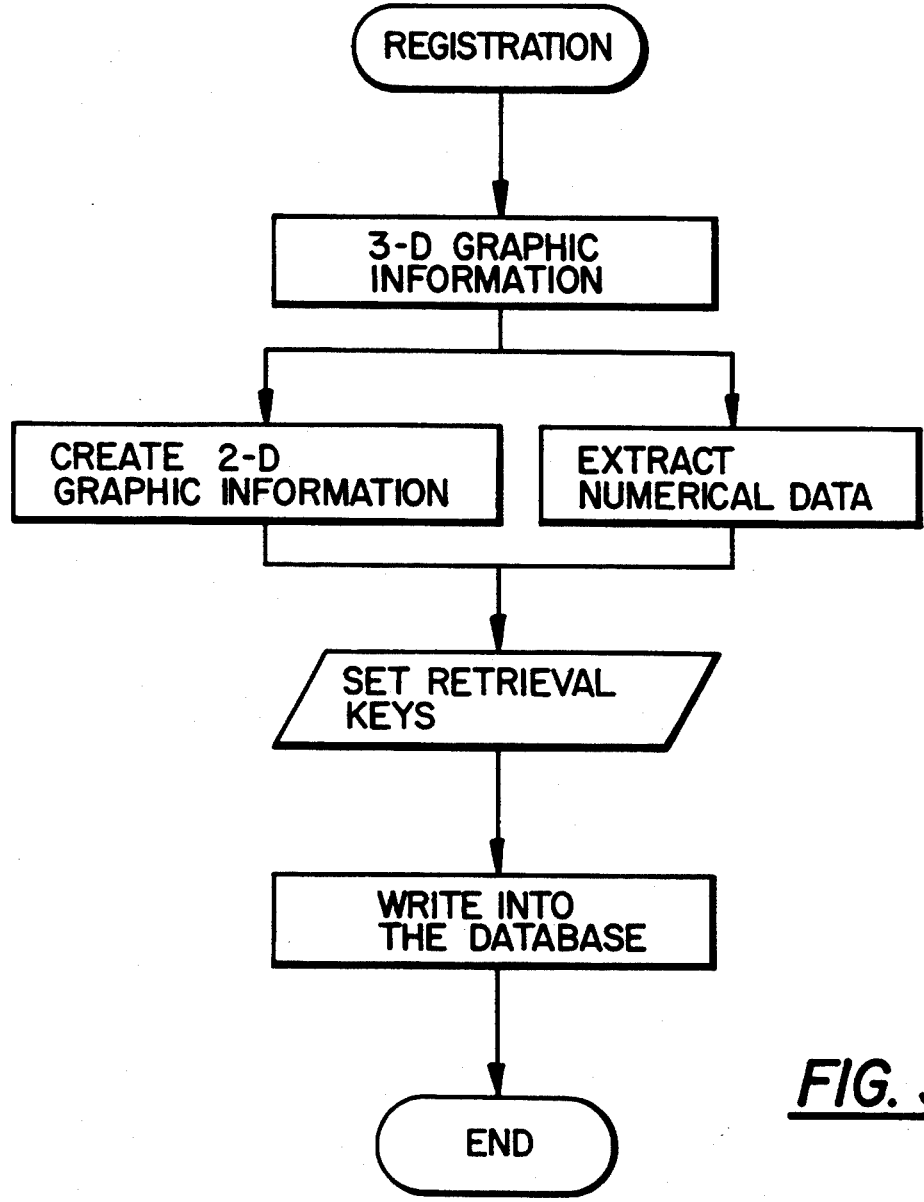
FIG. 3 is a flow chart depicting the steps for registering graphic data in the database.

FIG. 3 illustrates an operation flow chart for storing graphic data in the database 2 of this embodiment. When three dimensional graphic data is input, two dimensional contrast data is generated from the input three dimensional graphic data. Numerical data is extracted from the three dimensional graphic data and retrieval keys corresponding to the three dimensional graphic data and the key images defined by the two dimensional contrast data are set and written in the database.

FIG. 4 illustrates an operation flow chart for writing the various data in the database. The three dimensional data is first written into the database followed by the generated two dimensional contrast data and the retrieval keys. The database is then set to allow this data only to be read out and prevents additional data from being read in to protect the data stored in the database.

FIG. 5 illustrates a flow chart depicting the retrieval steps. When the retrieval keys are input, two dimensional contrast data is displayed as the two dimensional key images. The operator can evaluate the shapes of these key images and select a particular key image. Then, data defining the corresponding three dimensional graphic data is retrieved.

This system is constructed to allow selection and simultaneous display of plural pieces of graphic data on a CRT display screen. The central processing unit 1 of the system can simultaneously display plural pieces of two dimensional contrast data as key images on the screen of said CRT display unit at a position and size designated from the operation terminal. This construction permits display and evaluation of various combinations of many shapes.

The three dimensional graphic data that defines the three dimensional shapes displayed on the CRT display screen can be corrected or revised by a revision program that can be provided. However, according to the present invention, by using previously designed shapes as the basic shapes and designing a new shape based on these retrieved basic shapes, the number of design steps can be greatly reduced.

Although the preferred embodiment of this invention has been described, it will be obvious to those skilled in the art that various changes and modifications may be made therein without departing from the invention. Therefore, the claims are intended to include all such changes and modifications that fall within the true spirit and scope of the invention.

What is claimed is:

1. A system for retrieving graphic data images representing three dimensional shapes, comprising:
   a CRT display unit comprising a display screen;
   a database comprising:
      first memory means for storing a plurality of sets of graphic data, each one of the plurality of sets of graphic data representing a three dimensional shape;
      contrast image generation means for generating a plurality of contrast images, each one of the plurality of contrast images being respectively generated from corresponding ones of the plurality of sets of graphic data, each one of the plurality of contrast images being a two dimensional contrast view of a represented three dimensional shape showing a contrast of a shape of the represented three dimensional shape;
      second memory means for storing the plurality of contrast images; and
   means for correlating each one of the plurality of sets of graphic data representing the plurality of contrast images with a corresponding one of the plurality of sets of graphic data; controlling means for providing control signals from a user of the system; and
   a central processing unit comprising:
      first display means for displaying, in accordance with the control signals, a first predetermined number of the plurality of contrast images on a first portion of the display screen;
      selecting means for selecting, in accordance with the control signals, at least one of the first predetermined number of the plurality of contrast images displayed on the first portion of the display screen;
      retrieving means for retrieving one of the plurality of sets of graphic data corresponding to a selected one of the first predetermined number of the plurality of contrast images out of the database; and
      second display means for displaying, on a second portion of the display screen, the three dimensional shape represented by the one of the plurality of sets of graphic data corresponding to the selected one of the first predetermined number of contrast images.

2. A system for retrieving graphic data images representing three dimensional shapes according to claim 1, wherein the controlling means further comprises:
   a mouse connected to the central processing unit; and
   a keyboard connected to the central processing unit, the mouse and the keyboard for providing the control signals.

3. A system for retrieving graphic data images representing three dimensional shapes according to claim 1, wherein the retrieving means includes retrieval key means for correlating the plurality of contrast images with the corresponding ones of the plurality of sets of graphic data.

4. A system for retrieving graphic data images representing three dimensional shapes according to claim 1, wherein the first display means is for displaying, in accordance with the control signals, a second predetermined number of a plurality of cross-sectional images on the first portion of the display screen, each one of the plurality of cross-sectional images respectively representing corresponding ones of the plurality of sets of graphic data, each one of the plurality of cross-sectional images being a two dimensional outline shape of the represented three dimensional shape.

5. A system for retrieving graphic data images representing three dimensional shapes according to claim 1, wherein the first display means comprises means for segregating the first portion of the display screen into a first predetermined number of segmented portions of the first portion of the display screen and displaying each of the first predetermined number of the plurality of contrast images in respective ones of the segmented portions of the first portion of the display screen.

6. A system for retrieving graphic data images representing three dimensional shapes according to claim 1, wherein:

the selecting means selects a plurality of the plurality of contrast images;

the retrieving means retrieves a plurality of sets of graphic data corresponding to selected ones of the plurality of contrast images out of the database; and the second display means displays, simultaneously on the second portion of the display screen, the plurality of sets of graphic data retrieved by the retrieving means.

7. A system for retrieving graphic data images representing three dimensional shapes according to claim 1, wherein the system is a system for designing packaging bottles.

8. A method for retrieving graphic data images representing three dimensional shapes, comprising the steps of:

storing a plurality of sets of graphic data, each of the plurality of sets of graphic data representing a three dimensional shape in a database;

generating a plurality of contrast images from corresponding ones of the plurality of sets of graphic data, each one of the plurality of contrast images being a two dimensional view of a represented three dimensional shape showing a contrast of a shape of the represented three dimensional shape;

storing the plurality of contrast images in the database;

correlating each of the plurality of contrast images with their corresponding one of the plurality of sets of graphic data;

providing control signals to a central processing unit;

firstly displaying, in accordance with the control signals, a first predetermined number of the plurality of contrast images on a first portion of a display screen of a CRT display unit;

selecting, in accordance with the control signals, at least one of the first predetermined number of the plurality of contrast images displayed on the first portion of the display screen;

retrieving at least one of the sets of graphic data corresponding to the at least one contrast image selected by the selecting step out of the database; and secondly displaying, on a second portion of the display screen, the at least one of the sets of graphic data retrieved by the retrieving step.

9. A method for retrieving graphic data images representing three dimensional shapes according to claim 8, wherein the retrieving step includes the step of retrieving the one of the plurality of sets of graphic data corresponding to the contrast image selected by the selecting step using retrieval key means for identifying the plurality of sets of graphic data, the retrieval key means including information regarding a shape represented by the corresponding one of the plurality of sets of graphic data.

10. A method for retrieving graphic data images representing three dimensional shapes according to claim 8, wherein the first display step includes a further step of displaying, in accordance with the control signals, a second predetermined number of a plurality of cross-sectional images on the first portion of the display screen, each one of the plurality of cross-sectional images respectively representing corresponding ones of the plurality of sets of graphic data, each one of the plurality of cross-sectional images being a two dimensional outline shape of the represented three dimensional shape.

11. A method for retrieving graphic data images representing three dimensional shapes according to claim 8, wherein the step of firstly displaying includes a step of replacing the first predetermined number of the plurality of contrast images with a third predetermined number of the plurality of contrast images, the third predetermined number being equal to the first predetermined number.

12. A method for retrieving graphic data images representing three dimensional shapes according to claim 8, wherein the method is used to design packaging bottles.

* * * * *